July 1, 1952 R. L. CARBREY 2,602,158

CODER FOR PULSE CODE MODULATION

Filed Feb. 9, 1949 2 SHEETS—SHEET 1

INVENTOR
R. L. CARBREY
BY George C. Ford
ATTORNEY

July 1, 1952 R. L. CARBREY 2,602,158

CODER FOR PULSE CODE MODULATION

Filed Feb. 9, 1949 2 SHEETS—SHEET 2

INVENTOR
R. L. CARBREY
BY George C. Ford
ATTORNEY

Patented July 1, 1952

2,602,158

UNITED STATES PATENT OFFICE 2,602,158

CODER FOR PULSE CODE MODULATION

Robert L. Carbrey, Summit, N. J., assignor to Bell Telephone Laboratories, Incorporated, New York, N. Y., a corporation of New York Application February 9, 1949, Serial No. 75,349

12 Claims. (Cl. 332—11)

This invention relates to pulse code modulation systems and particularly to coders therefor.

In communication systems utilizing what is known as pulse code modulation or PCM a speech wave or other signal to be transmitted is sampled periodically to ascertain its instantaneous amplitude which is then expressed by a permutation pulse code analogous to a telegraph code. Such codes employ groups of pulses each of a fixed number of pulses or pulse intervals. An advantageous code of this type analogous to the conventional printing telegraph code is one employing on-off pulses, that is, a two-value code. Such a code has a certain maximum advantage in discriminating against noise. Codes employing pulses of more than two values can be used and are often advantageous in certain applications.

These permutation codes are analogous to numeration systems in that each code element in each of its values represents a certain definite component amplitude of the total range of amplitudes that may be expressed by the code and the component amplitude represented by the same values of adjacent code elements bear a ratio to each other equal to the number of possible values of the code elements in the particular code used.

One classification of pulse code modulation systems is on the basis of the number of possible values assigned to each code element and because of the analogy to the numeration systems of corresponding bases such types of systems may be designated by similar terms, that is, binary, ternary, etc. With any code the total number of permutations obtainable is equal to $m^n$ where $m$ is the number of possible values assigned to each code element and $n$ is the number of code elements.

Since the number of different amplitudes that can be represented by any code is determined by the number of code elements used, it is impossible to truly represent the amplitude samples since they may be of an infinite number of values. Accordingly, the continuous range of amplitude values of which the transmitted signal is capable is divided into a fixed number of constituent ranges together encompassing the total range. Each of the constituent amplitude ranges is then represented by an individual one of the permutations of the code, and signal amplitudes falling within the limits of any constituent range are treated as a single amplitude. This process is called quantizing.

As previously indicated, the binary code employing on-off pulses gives a maximum advantage in discrimination against noise. On the other hand for a given number of quantizing steps or amplitude values, it requires the greatest number of code elements or pulses of any of the permutation codes. Since the band width requirements are directly proportional to the number of code elements or pulses whether these be transmitted on a time division basis or otherwise, the use of this code also requires the greatest band width. For many applications of pulse code modulation, it is accordingly necessary to balance the factors of noise advantage, band width, and quality as determined by the number of quantizing steps in the choice of the code to be used.

It will be observed that in any of the permutation codes, each code element of a code group may be considered to represent a definite constituent part of the total amplitude range. In one type of ternary code, for example, each code element may have any of the values 0, 1 or 2. The portions of the amplitude range represented by each of these code values depends upon which code element of a code group is involved. Assume a code group in which the four code elements have respectively the values 1–2–0–1, the code elements being numbered from the right in ascending denominational order. In the first code element, the values 0, 1 and 2 represent like portions of the total amplitude. In the second code element, the values 0, 1 and 2 represent respectively amplitude constituents of 0, 3 and 6 units. In the third code element, the three values represent respectively 0, 9 and 18 units while in the final code element the three values represent amplitudes of 0, 27 and 54 units, respectively. If the contributions of the four code elements in the group 1–2–0–1 are determined in accordance with the above and are combined, the decimal number representing the amplitude corresponding to that code group may be obtained. The total amplitude represented by this particular group is thus $1+0+18+27=46$. The code elements of any permutation code may be evaluated in similar fashion and the value represented by any code group obtained.

It is the object of the present invention to provide means responsive to a wave to be transmitted for generating code groups of pulses in which multivalued code elements are employed, and more specifically, to provide a coder arranged to generate code representations of the amplitude of a message wave comprising groups of $n$ pulses, each of which may have any of $m$ values.

A coder according to the invention comprises an electron beam tube having means for pro- Means responsive to the signal amplitude are provided for deflecting the electron beam to any of $m^n$ different positions on the coding plate and for each such position the coding plate is provided with a row of target areas corresponding to the $n$ pulses of the code groups to be produced. Circuits are associated with each of these areas and are completed by the electron beam. These circuits, including the target areas have combined transmission characteristics which are respectively proportional to the $m$ values of the code pulses and serve when the beam impinges upon a particular row of target areas to represent the amplitude corresponding to the particular deflection of the electron beam in a code founded upon a system of numeration of base $m$.

The combined transmission characteristic of the target areas referred to above and the circuits associated therewith and completed by the electron beam may be obtained in a variety of ways. For example, the target areas may be represented by apertures in the coding plate indicative by their positions or by their areas of the several values $m$ of each code element. Alternatively, secondary emission may be used as a distinguishing characteristic, the target areas representing the several amplitudes or values of the code element pulses producing secondary emission in varying degrees. As another alternative, the target areas may be represented by apertures of identical size in the coding plate and the pulses produced by the transmission of the electrons of the beam therethrough may be weighted in auxiliary circuits to produce signals of the $m$ amplitudes as required.

Apparatus suitable for decoding signals of the type herein contemplated is disclosed in my copending application Serial No. 75,350, filed February 9, 1949, now Patent 2,505,029, April 25, 1950.

The above and other features of the invention will be described in detail in the following specification taken in connection with the drawings in which.

For the purposes of the following detailed description the coders of the invention will be described as arranged specifically for the production of code groups according to a ternary code wherein $m$, the number of code element values, equals 3 and $n$, the number of code element pulses, equals 4.

Figure 1:
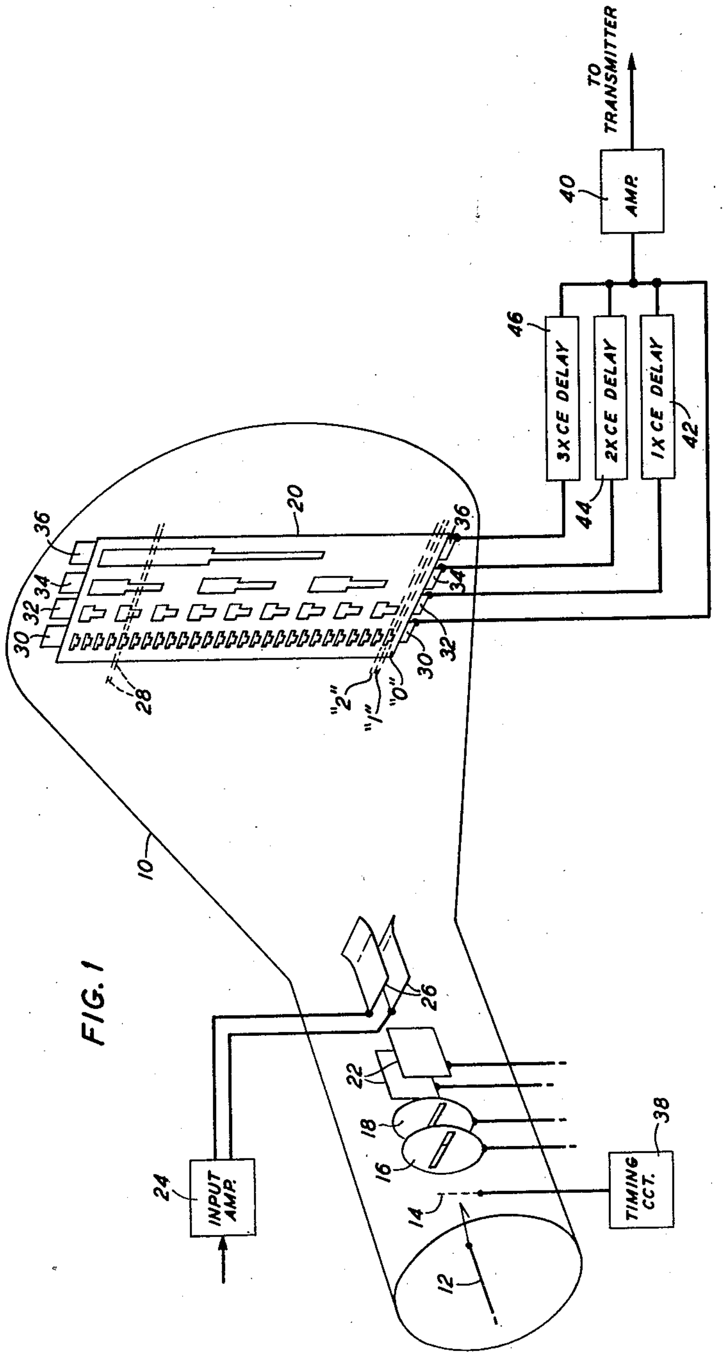
Fig. 1 is a schematic representation of a coder in accordance with the invention.

In the coder of Fig. 1 each of the target areas of the row corresponding to a particular signal amplitude comprises an opening of area proportional to the value of the corresponding code element as required for the code representation of that amplitude. Thus the openings in the target areas for any particular code element may be one unit in area or two units in area corresponding to the code element values of 1 and 2 or the target area may contain no opening corresponding to a code element value of 0. Referring now to Fig. 1 the coder comprises an electron beam tube 10 having therein means for producing a line or ribbon beam of electrons comprising a cathode 12, control grid 14 and beam forming or accelerating electrodes 16 and 18. These elements of the tube are connected to suitable sources of potential (not shown) in the conventional manner and operate to form a ribbon beam extending in the plane defined by the openings in electrodes 16 and 18.

A coding plate 20 is positioned to intercept the ribbon beam and a pair of deflection plates 22 through the application of suitable voltages controls the horizontal position of the beam. A message wave to be encoded is applied through an amplifier 24 to a pair of deflection plates 26 which in response to the signal controls the vertical position of the beam. A suitable source of bias may be provided to maintain the beam at the lower edge of the coding plate when the amplitude of the input signal is zero. If, however, it is desired to encode signals which may be either positive or negative such bias may be so adjusted that for a message wave of zero amplitude the beam will strike at the center on the coding plate.

The coding plate is constructed to define a plurality of rows of target areas extending across the plate parallel to the plane of the electron beam. Each such row of target areas includes four constituent areas each representing one of the four elements of the code to be produced. Thus the areas beginning at the left-hand side of the target of the coding plate may be considered to represent the first, second, third and fourth code elements. Each of these constituent areas is given a transmission characteristic representative of the value which the corresponding code element must have in order to define the vertical position of the row of areas in terms of the code to be employed. In the coder of Fig. 1, a four element ternary code wherein each code element may have any of the values 0, 1, 2 is contemplated. If the first amplitude to be represented is taken as zero, the corresponding code group may be written 0000. The amplitude position for a signal of zero amplitude is indicated at "0" on the code plate 20 of Fig. 1 and it will be seen that for this position no target area openings are provided. The code group corresponding to an amplitude of 1 is written 0001 where the code elements are numbered from the right in accordance with the convention chosen above. In the corresponding row of target areas in the coding plate, as indicated at "1," the target area for the first code element is provided with an opening one unit in area while the remaining target areas of the row have no openings.

In the row of target areas assigned to represent a signal amplitude of "2" the required code group is 0002. This is obtained, as shown in Fig. 1 by providing the target area for the first code element with an opening of twice the area of that provided in the row for a signal amplitude of 1 while no openings are provided in the other areas.

In the same way the areas of the apertures in the target areas for the code elements of each row are made respectively proportional to the values for those code elements required by the particular code group representing that amplitude. Consider for example the portion of the code plate indicated by the dotted lines 28. If the areas of the target apertures corresponding to the four code elements are written down in order the first denominational order appearing at the left of the target, etc., it will be seen that this particular row constitutes a representation of the code group 2112. This corresponds to the decimal number 68.

The possibility that the beam will be deflected to a position midway between adjacent rows of the coding plate may be eliminated by the provision of a so-called quantizing grid arrangement of the type described at pages 46–49 of an article by R. W. Sears entitled "Electron beam deflection tube for PCM" beginning at page 44 in "The Bell System Technical Journal" for January 1948.

Thus it will appear that upon deflection of the ribbon beam by the message signal portions thereof are allowed to pass through the coding plate and because of the different areas of the apertures, the total electron currents of such portions correspond to the appropriate values of the respective code elements to represent a particular signal amplitude. The resultant streams of electrons impinge upon collectors 30 through 36 corresponding respectively to the four code elements. The currents flowing in the circuits each including one of these collectors, auxiliary equipment and the electron beam are thus weighted in accordance with the values of the four code elements as required for the representation of any particular signal amplitude.

Thus far it has been assumed that the message signal is applied continuously to the deflection plates 26 and under these circumstances the currents flowing in the four collectors will constitute a code group which is continuously representative of the message signal amplitude. For some purposes it may be desirable to transmit this information in this form. However, it is often more convenient to transmit such information in the form of discrete pulses which may then be distributed in time for transmission over a single channel or transmitted separately and simultaneously over different channels interleaved with pulses from other sources, as for example, additional coders, representing other message signals. For this purpose a bias voltage is applied to control grid 14 normally to prevent formation of a beam and a timing circuit 38 is arranged to switch the beam on at predetermined intervals. Thus, when a code group is to be produced, a positive pulse from timing circuit 38 of such amplitude as to overcome the cut-off bias is applied to control grid 14. This permits the formation of the beam which strikes coding plate 20 at a position determined by and indicative of the amplitude of the message wave then applied to deflection plates 26. As a result the output leads from collectors 30 through 36 carry pulses of current of relative amplitudes of 0, 1 or 2 dependent upon the values of the code elements required for the representation of that particular amplitude.

It will be recognized that these output pulses occur simultaneously on the separate output leads. If it is desired to transmit these pulses serially over a single channel any suitable form of distributor may be employed. In one convenient type of distributor delay lines are used. Thus and as shown in Fig. 1 the first code element pulse is applied from collector 30 to amplifier 40 without the introduction of any delay. The second code element pulse is applied to a delay line 42 which introduces a delay equal to the code element pulse length and the output is applied to amplifier 40. Similarly, the code element pulses from collectors 34 and 36 are applied to delay lines 44 and 46 which introduce delays respectively equal to two and three times the code element pulse length. Accordingly the four code element pulses occur serially at the output of the amplifier 40. These pulses may be employed to modulate the transmitter of any convenient form of transmission system.

In the above description it has been assumed that each of the target areas of each row representing a code group was represented by an aperture of size corresponding to the appropriate value for each code element of the particular code group. It will be understood that these areas may be formed of secondary electron emissive materials either the extent or the emissivities of which are chosen to result in the emission of secondary selections in amounts proportional to the appropriate values of the code elements. In such case collectors 30 through 36, supplied with appropriate operating potentials would be positioned to intercept such secondary emission. In other respects, the system would operate in the same manner as that described above.

Figures 2, 3:
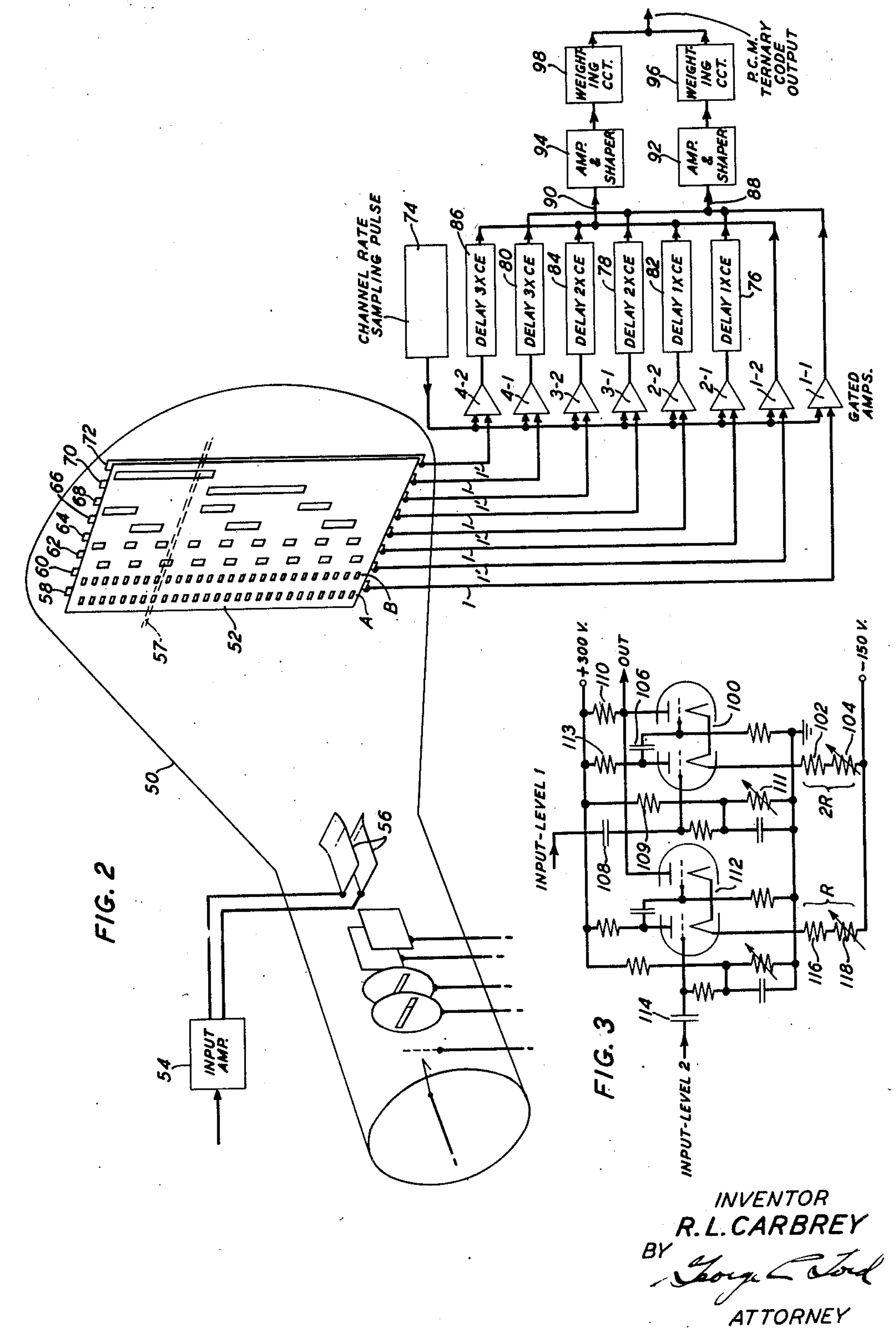
Fig. 2 is a schematic representation of another form of coder also in accordance with the invention.
Fig. 3 is a circuit schematic diagram showing details of certain of the elements of the coder of Fig. 2.

Fig. 2 illustrates another embodiment of the invention wherein the transmission characteristics of the combined circuits including the electron beam and the output circuits from the collectors of the coding tube are determined by weighting devices included in the external circuits rather than by operations performed upon the beam itself. As in the case of the coder of Fig. 1 an electron beam tube 50 is provided with suitable means for producing a line or ribbon beam of electrons which is projected down the tube against a coding plate 52. The input message wave to be encoded is applied through an amplifier 54 to deflection plates 56 to control the vertical position at which the beam intercepts the coding plate. All of these elements are identical to those considered in connection with the coder of Fig. 1 and need not be further considered here. In this embodiment however, the coding plate differs from coding plate 20 of Fig. 1 in that the various values of the code elements are distinguished by the positions of apertures of equal size located within each of the target areas for each code group.

Thus for the first code element a value of 0 is represented by the absence of an opening in the plate, a value 1 is represented by opening in row A and value 2 by an equal sized opening in row B. For a signal amplitude of 0 the beam strikes the first row at the bottom of the coding plate. No openings appear in any of the target areas of this row and code group 0000 is produced. In the second row, corresponding to a message amplitude of 1 the beam strikes only one opening which is located in column A in the first target area and the code group may be writted 0001. In the row corresponding to a message amplitude of 2, the only opening found by the beam is one in column B for the first code element.

Since all the openings for any code element are of equal areas the code group is written 0001′ rather than 0002 as the coder of Fig. 1, the prime being applied to indicate that the opening is in the position (column B) corresponding to the code element value of 2. In similar fashion if the beam were to strike the coding plate at the position indicated by the dashed lines 57, the resulting code group might be written 1101′ corresponding to a decimal number of 1+3+0+54 or 58. Separate collector plates 58 through 72 are provided to collect electrons which are transmitted respectively through apertures in columns A and B of the target areas representing each of the four code elements. It will be recognized that the output signals appearing on any of these collectors will be of equal amplitude, those on collectors 58, 62, 66 and 70 representing code element values of 1 and those on the remaining collectors representing code element values of 2.

In order to convert these outputs into code groups of pulses having amplitudes 0, 1 or 2, it is necessary to provide auxiliary circuits which are connected to the respective collectors. Thus the collector plates are connected to gated amplifiers identified in the figure as 1—1 through 4—2, respectively, gated amplifiers 1—1 and 1—2 being associated with collectors 58 and 60 representing the pulse values 1 and 2 for the first code element, etc. The continuously varying output signals from the eight collector plates are converted into simultaneously occurring pulses through the use of a sampling pulse obtained from a pulse generator 74 and applied in parallel to all of the gated amplifiers. Thus there are available simultaneously at the output of the gated amplifiers pulses bearing information as to the amplitude of a message signal. This information is represented by some combination of 8 pulses each of which has either of two values. In order to obtain the desired ternary code representation it is necessary to weight these pulses in accordance with the code element values which they represent or to give them some other distinguishing characteristic. It is convenient at the same time to distribute the pulses in time so that the ultimate output will comprise code groups of serially occurring pulses suitable for transmission over a single message link.

For this purpose the outputs of gated amplifiers 1—1, 2—1, 3—1 and 4—1 are applied to a delay line distributor identical to that employed in the system of Fig. 1 and comprising delay lines 76, 78 and 80. The outputs of the remaining gated amplifiers are applied to an identical delay line distributor comprising delay lines 82, 84 and 86. The outputs of the delay lines for each of the two distributors are connected in parallel to provide a single output lead from each distributor, these leads being identified at 88 and 90. It will be observed that the delays introduced by the two distributors in the pulses occurring in either collector output lead for any code element are the same. Thus a pulse from the gated amplifier 1—1 is delayed by the same amount as one from gated amplifier 1—2. Similarly, a pulse from gated amplifier 3—1 is delayed by the same amount as one from gated amplifier 3—2. Since by the nature of the coding plate, pulses cannot occur simultaneously in both gated amplifiers of any pair, it will be seen that each time a gating pulse is applied from pulse generator 74 the pulse output of the two distributors occurring on leads 88 and 90 taken together will comprise a single code group of pulses of amplitudes 0 or 1. The pulses of amplitudes 0 or 1 on lead 88 then represent values of 0 or 1 while those on lead 90 represent code element values of 0 or 2. In order to complete the conversion to ternary code groups the pulses on each of leads 88 and 90 are applied through amplifiers 92 and 94 respectively to pulse weighting circuits 96 and 98, the outputs of which are connected in parallel. Weighting circuit 96 is adjusted to produce output pulses of amplitudes 0 or 1 in response to pulses of amplitudes 0 or 1 occurring on lead 88 while weighting circuit 98 is arranged to produce pulses of amplitudes 0 or 2 in response to pulses from lead 90 of amplitudes 0 or 1 respectively. The parallel output from the two weighting circuits is thus made up of code groups of pulses having amplitudes of 0, 1 or 2 depending upon the position in which the electron beam strikes coding plate 52. It will be recognized, however, that other distinguishing characteristics may be given the pulses. For example, weighting circuit 96 may be adjusted to produce pulses of amplitudes 0 or 1 in response to pulses of amplitudes 0 or 1 on lead 88 with weighting circuit 98 correspondingly adjusted to give output pulses of amplitude 0 or −1 in response to pulses of amplitudes 0 or 1 on lead 90. It is obvious that other distinguishing pulse values may also be employed.

Details of the pulse weighting circuits 96 and 98 are shown in Fig. 3. Each of these circuits comprises essentially a single trip multivibrator which may, for example, comprise the two sections of a dual-triode tube connected in a conventional circuit. In single trip multivibrator 100, for example, the direct current connection between the two tubes of the multivibrator is accomplished by reason of a common cathode resistor comprising a fixed resistor 102 and a variable resistor 104 connected in series, while the alternating current connection from the plate of the left-hand section to the control grid of the right-hand section is accomplished through the use of a coupling capacitor 106. The positive voltage applied as bias to the control grid of the left-hand section of the single trip multivibrator is so adjusted that current normally flows through this section. Under this condition no current flows through the right-hand section of multivibrator tube 100. The negative pulses from amplifier 92 of Fig. 2 are applied through a coupling capacitor 108 to the control grid of the left-hand section of single trip multivibrator 100. A bias voltage developed across the adjustable divider comprising resistor 109 and variable resistor 111 connected in series between a source of positive potential indicated at +300 and ground is applied to the grid of the left-hand section of tube 100 to set an operating threshold for the circuit. This bias normally maintains the grid only slightly more positive than the full conduction value. Consequently a relatively small negative pulse will trigger the circuit. Assume, for example, single trip multivibrator 100 is in its normal condition with current flowing in the left-hand section of the tube. When a pulse of negative polarity and the required amplitude is applied through capacitor 108 to the control grid of the left-hand section, the flow of current in this section of the tube is cut off and this allows initiation of current flow through the right-hand section in the usual fashion. Current flows in the right-hand section of single trip multivibrator 100 through a circuit comprising the source of positive potential indicated at +300, load resistor 110, the right-hand section of tube 100 and the cathode resistor comprising resistor 102 and variable resistor 104 in series and thence through a source of negative bias potential identified as −150 to ground. The total cathode resistance is so adjusted that a specified voltage drop is produced across load resistor 110. At the conclusion of an input pulse and after an interval determined by the values of the intertube coupling capacitor 106, the grid return resistor of the right-hand section, and the load resistor 113 of the left-hand section, the circuit returns to its normal condition in which current flows again through the left-hand section of the tube.

Single trip multivibrator 112 is identical to single trip multivibrator 100 with the exception of circuit values and operates in the same fashion in response to a negative input pulse from amplifier 94 Fig. 2, applied through capacitor 114.

Here, however, the circuit of the right-hand section of the tube includes load resistor 110 which is connected in common in the anode circuits of the right-hand sections of tubes 100 and 112, the tube and a cathode resistor comprising resistor 116 and a variable resistor 118 in series. The sum of the resistances of resistors 116 and 118 is adjusted so that the current flow through the circuit including the right-hand section of tube 112 is just twice that through the circuit including the right-hand section of tube 100 with the result that a drop twice as large as that produced by multivibrator 100 across resistor 110 is produced whenever single trip multivibrator 102 is triggered. Thus in response to the application of pulses of amplitude 1 through capacitor 108 the circuits just described produce an output pulse across resistor 110 of amplitude 1 while in response to the application of input pulses of amplitude 1 through capacitor 114 the circuits produce an output pulse of amplitude 2. The required weighting of pulses to convert the output of the two delay-line distributors into a single ternary pulse code group and the combination of pulses into a single output circuit is thus accomplished in one operation.

What is claimed is:

1. A coder for representing signal amplitudes by code groups of $n$ pulses each of which may have any of a number of values $m$ which is at least three comprising an electron beam tube, means for establishing a ribbon beam therein, means responsive to a signal for deflecting said beam to the appropriate one of $m^n$ positions each corresponding to a code group and representing a different signal amplitude, a plate having for each of said positions a row of $n$ target areas, and a circuit associated with each of said target areas and completed by said beam, the combined transmission characteristics of each area and circuit being proportional to that one of the $m$ values of the respective code pulse appropriate to the code group for the particular position of said beam.

2. A coder for representing signal amplitudes by code groups of $n$ elements each of which may have any of a number of values $m$ which is at least three comprising an electron beam tube, means for forming an electron beam therein, means responsive to signals for deflecting said beam to any one of $m^n$ positions each corresponding to a code group and representing a different signal amplitude, a coding plate having for each position a row of target areas intercepting said beam, these target areas corresponding to the $n$ elements of the code groups and having transmission characteristics respectively proportional to the $m$ values of the code elements to represent that position in the code, and a plurality of collectors of electrons transmitted from said target areas, one for each code element.

3. A coder for representing signal amplitudes by code groups of $n$ pulses each of which may have any of a number of values $m$ which is greater than two comprising an electron beam tube, means for forming a ribbon beam of electrons therein, means responsive to a signal for deflecting said beam to the one of $m^n$ different positions each corresponding to a different signal amplitude, a coding plate intercepting said beam and having for each position a row of defined areas corresponding to the $n$ code pulses, an aperture in each area except those representing a value of zero in the code for that position, said apertures being located in said areas to indicate the code values represented thereby, and a collector behind each aperture location for each code pulse.

4. A coder for representing signal amplitudes by code groups of $n$ pulses each of which may have any of a number of values $m$ which is greater than two comprising an electron beam tube, means for forming a line beam therein, means responsive to a signal for deflecting the beam to the appropriate one of $m^n$ different positions each of which represents a different signal amplitude, a coding plate intercepting said beam and having for each of said positions a row of target areas corresponding to the $n$ code pulses, an aperture in each area of each row, except those areas representing code pulse values of zero in the code for the corresponding position, located within the areas in accordance with the code pulse values represented by said areas and with the apertures for each code pulse for each row in alinement, and a separate collector for each set of alined apertures for collecting portions of the electron beam traversing said apertures.

5. A coder for representing signal amplitudes by code groups of $n$ pulses each of which may have any of a number of values $m$ which is at least three comprising an electron beam tube, means for forming a ribbon beam therein at predetermined intervals, means responsive to a signal for determining in which of $m^n$ positions of deflection a beam will be formed at said intervals, a coding plate intercepting said beam and having for each of said positions a row of apertures of areas corresponding to the values of the $m$ code pulses to express the amplitude corresponding to that position in the code, a separate collector extending behind the apertures for each code pulse and intercepting portions of said beam passing said apertures, a circuit associated with each collector and arranged to be completed by passage of the beam through said apertures, and means for transforming the currents flowing in said circuits into code groups of serial pulses.

6. A coder for representing signal amplitudes by code groups of $n$ code elements each of which may have any of a number of values $m$ which is at least three comprising, an electron beam tube, means for forming a ribbon beam of electrons therein, means responsive to a signal for deflecting said beam to the appropriate one of $m^n$ positions each corresponding to a code group and representing a different signal amplitude, a plate intercepting said beam and having for each position a row of $n$ targets the areas of which correspond respectively to the $m$ values of the code elements to represent that position in the code, and separate collectors for each code element for electrons transmitted from said areas.

7. A coder for representing signal amplitudes at desired sampling intervals by code groups of $n$ code elements each of any of a number of values $m$ which is at least three comprising, an electron beam tube, means for forming a beam therein, means responsive to signals for deflecting the beam to the appropriate one of $m^n$ positions, each corresponding to a code group and representing a different signal amplitude, a plate having for each position a row of target areas corresponding to the $n$ code elements and having transmission characteristics respectively proportional to the $m$ values of the code elements to represent the position in the code, separate collectors for each of the $m$ values other than zero of each code element for electrons transmitted from said target areas in response to impingement of the beam thereon, and means for converting the outputs occurring simultaneously at said collectors at each sampling interval into a group of pulses occurring serially in a single output circuit.

8. A coder for representing signal amplitudes by code groups of $n$ pulses each of which may have any of a number of values $m$ which is greater than two comprising an electron beam tube, means for forming a beam therein, means responsive to a signal for deflecting the beam to the appropriate one of $m^n$ positions each corresponding to a code group and representing a different signal amplitude, a plate intercepting said beam and having for each position a row of target areas corresponding to the $n$ pulses of the code group, there being an aperture in each area for each row except those representing code element values of zero and the location of said apertures in said areas being determined by the values of the code elements represented by said areas, collectors for electrons from apertures in each location for each code element, separate distributing means connected to all collectors for each code element value and arranged to convert the outputs from said collectors into time distributed pulses in a single output circuit, and means in the output of each of said distributing means for giving a characteristic to pulses therefrom representative of the code element value to which the pulses correspond.

9. A coder for representing signal amplitudes by code groups of $n$ pulses each of which may have any of a number of values $m$ which is at least three comprising an electron beam tube, means for forming a beam therein, means responsive to signals for deflecting the beam to any of $m^n$ positions each corresponding to a different signal amplitude, a plate intercepting said beam and having for each position a row of target areas corresponding to the $n$ pulses of the code group, there being an aperture in each area for each row except those representing code element values of zero and the location of said apertures in said areas being determined by the values of the code elements represented by said areas, collectors for electrons from apertures in each location for each code element, separate simultaneously operative distributing means for converting the outputs from all collectors for each code element value into time distributed pulses in a single output circuit, means in the output of each of said distributing means for producing pulses of an amplitude representing the corresponding code element values, and means for combining the output pulses from said last-mentioned means for transmission.

10. A coder for representing signal amplitudes by code groups of $n$ pulses at predetermined sampling times each of which may have any of a number of values $m$ which is greater than two comprising an electron beam tube, means for forming a beam therein, means responsive to a signal for deflecting the beam to the appropriate one of $m^n$ positions, each corresponding to a different signal amplitude, a plate intercepting said beam and having for each position a row of target areas corresponding to the $n$ pulses of the code group there being an aperture in each area for each row except those representing code element values of zero and the location of said apertures in said areas being determined by the values of the code elements represented by said areas, separate collectors for each code element value other than zero for collecting electrons transmitted from target areas, and gate circuits operating at the sampling times to apply the output quantities from said collectors to identical distributors having a common output and arranged to distribute current impulses from said collectors in the interval between sampling times to produce a single series of pulses for transmission.

11. A coder for representing signal amplitudes by code groups of $n$ pulses each of which may have any of three values including zero comprising an electron beam tube, means for forming a ribbon beam therein, means responsive to a signal for deflecting the beam to the proper one of $3^n$ positions, each corresponding to a different signal amplitude, a plate intercepting said beam and having for each position a row of target areas corresponding to the $n$ pulses of the code groups and having transmission characteristics respectively proportional to the three values of the code pulses to represent the position in a code founded upon a system of numeration of base three, and separate collectors for each code element for electrons transmitted from said target areas.

12. A coding tube for pulse code modulation wherein code groups of $n$ pulses, each of which may have any of a number of values $m$ which is at least three are employed comprising, an evacuated envelope, means for forming an electron beam therein, means for deflecting the beam to any of $m^n$ positions, each corresponding to a different signal amplitude, and a plate intercepting said beam and having for each position a row of target areas corresponding to the $n$ pulses of the code group and having transmission characteristics respectively proportional to the $m$ values of the code elements to represent the position amplitude in a code founded on a system of numeration of base $m$.

ROBERT L. CARBREY.

REFERENCES CITED

The following references are of record in the file of this patent:

UNITED STATES PATENTS

| Number | Name | Date |
|---|---|---|
| 2,053,268 | Davis | Sept. 8, 1936 |
| 2,458,652 | Sears | Jan. 11, 1949 |
| 2,463,535 | Hecht | Mar. 8, 1949 |
| 2,468,100 | Moskowitz | Apr. 26, 1949 |
| 2,473,691 | Meacham | June 21, 1949 |

OTHER REFERENCES

Article, "Electron Beam . . . . Modulation," by Sears; pages 45–58 from Monograph B–1518; B. T. S. Technical Journal, vol. 27, for January 1948.